United States Patent
Hoferer

(10) Patent No.: US 10,254,146 B2
(45) Date of Patent: Apr. 9, 2019

(54) FILL LEVEL MEASUREMENT BY MEANS OF SURFACE TOPOLOGY DETERMINATION TOGETHER WITH CENTER OF ROTATION CORRECTION

(71) Applicant: VEGA GRIESHABER KG, Wolfach (DE)

(72) Inventor: Christian Hoferer, Offenburg (DE)

(73) Assignee: VEGA GRIESHABER KG, Wolfach (DE)

( * ) Notice: Subject to any disclaimer, the term of this patent is extended or adjusted under 35 U.S.C. 154(b) by 331 days.

(21) Appl. No.: 15/308,191

(22) PCT Filed: May 2, 2014

(86) PCT No.: PCT/EP2014/059003
§ 371 (c)(1),
(2) Date: Nov. 1, 2016

(87) PCT Pub. No.: WO2015/165548
PCT Pub. Date: Nov. 5, 2015

(65) Prior Publication Data
US 2017/0059387 A1    Mar. 2, 2017

(51) Int. Cl.
*G01F 23/284* (2006.01)
*G01F 22/00* (2006.01)
(Continued)

(52) U.S. Cl.
CPC .......... *G01F 23/284* (2013.01); *G01F 22/00* (2013.01); *G01S 7/411* (2013.01); *G01S 13/88* (2013.01); *G01S 13/89* (2013.01)

(58) Field of Classification Search
CPC .... G01F 23/284; G01F 22/00; G01F 23/2845; G01F 23/2962; G01F 17/00; G01F 23/28;
(Continued)

(56) References Cited

U.S. PATENT DOCUMENTS 4,068,156 A    1/1978  Johnson et al.
8,881,588 B2 * 11/2014 Baer ................ G01F 23/284
                                                        73/293
(Continued)

FOREIGN PATENT DOCUMENTS

EP    2 128 576 A1    12/2009
WO   2012/155050 A2   11/2012

OTHER PUBLICATIONS

International Search Report dated Feb. 4, 2015 in PCT/EP2014/059003 filed May 2, 2014.

*Primary Examiner* — Olumide Ajibade Akonai
(74) *Attorney, Agent, or Firm* — Oblon, McClelland, Maier & Neustadt, L.L.P.

(57) ABSTRACT

The topology of a filling material surface is first determined by sampling the surface of the filling material in order to determine the fill level. When calculating the surface topology of the filling material, the measurement signal, which has been reflected at the filling material surface and has been picked up by the antenna unit of the fill level measurement device, is evaluated, taking into account the distance between the source of the measurement signal and a center of rotation of the main emission axis of the antenna. This makes it possible to accurately determine the fill level of bulk materials, even if the source of the measurement signal and the center of rotation of the main emission axis do not coincide.

16 Claims, 2 Drawing Sheets

(51) Int. Cl.
*G01S 7/41* (2006.01)
*G01S 13/88* (2006.01)
*G01S 13/89* (2006.01)

(58) Field of Classification Search
CPC ............ G01F 23/2928; G01F 23/0076; G01F 25/0061; G01F 1/76; H01Q 1/38; H01Q 1/225; G01S 13/88; G01S 13/89; G01S 13/42; G01S 7/411; G01S 7/4026; G01S 13/60
See application file for complete search history.

(56) References Cited

U.S. PATENT DOCUMENTS

| | | |
|---|---|---|
| 2009/0299662 A1 | 12/2009 | Fehrenbach et al. |
| 2010/0019952 A1 | 1/2010 | Poussin |
| 2010/0060512 A1* | 3/2010 | Garrod ................... G01F 1/002 342/124 |
| 2012/0221261 A1 | 8/2012 | Fehrenbach et al. |
| 2014/0350387 A1 | 11/2014 | Siewerdsen et al. |
| 2015/0048963 A1* | 2/2015 | Dieterle ................ G01F 23/284 342/5 |
| 2015/0253177 A1* | 9/2015 | Blodt ................... G01F 23/284 324/644 |

\* cited by examiner

FILL LEVEL MEASUREMENT BY MEANS OF SURFACE TOPOLOGY DETERMINATION TOGETHER WITH CENTER OF ROTATION CORRECTION

FIELD OF THE INVENTION

The invention relates to measuring the fill level in containers, on stockpiles or bunkers by determining the topology of the surface of the filling material or bulk material. The invention relates in particular to a fill level measurement device for determining a topology of a surface of a filling material or bulk material, to a method for measuring the fill level which determines the topology of the surface of a filling material or bulk material in order to calculate the fill level, to a program element and to a computer-readable medium.

BACKGROUND

In order to determine a fill level of a viscous, granular or coarse-grained filling material or bulk material (referred to as "filling material" hereinafter), it is advantageous to record the shape of the surface of the filling material. Since the surface of the filling material may be uneven and may comprise hollow troughs or bulk peaks for example, this information is important for being able to accurately determine the actual fill level or the mass of the filling material.

The information regarding the topology of the surface of the material to be monitored can also be advantageous in the field of object monitoring or mass flow detection.

Fill level measurement devices of this type can be designed to determine the surface topology of the filling material by scanning the surface, either by means of digital beamforming or by mechanically adjusting the main emission axis of the duplexer of the fill level measurement device. For accurate calculation of the surface topology, the evaluation unit of the fill level measurement device has to know the direction of the main emission axis of the duplexer of the fill level measurement device at all times during the measurement. However, it has been found that even with the exact knowledge regarding the direction of the main emission axis, the calculation of the surface topology of the filling material can be inaccurate.

SUMMARY OF THE INVENTION

This object is achieved by the features of the independent claims. Developments of the invention can be found in the dependent claims and the following description.

A first aspect of the invention proposes a fill level measurement device for determining a topology of a surface of a filling material or bulk material. The fill level measurement device, which is a fill level radar for example, comprises an antenna unit and an evaluation unit (calculation unit). The antenna unit is used to emit a measurement signal towards the surface of the filling material in a direction of a main emission axis of the antenna unit relative to the surface of the filling material, which direction can be changed by the fill level measurement device, in order to sample the surface. For example, the antenna or the entire fill level measurement device can be tilted so that the surface of the filling material can be scanned. The antenna is moved, for example, on a spherical shell for this purpose. It is also possible to provide an array antenna, by means of which the main emission axis of the antenna can be changed using digital beamforming. A combination of these two principles (mechanically adjusting or tilting the antenna and digital beamforming) can also be provided.

Furthermore, the antenna is designed to receive the measurement signal reflected at the filling material surface.

The evaluation unit is used to determine the topology of the surface of the filling material from the received measurement signal reflected at the filling material surface and a distance between a source of the measurement signal and a centre of rotation of the main emission axis of the antenna unit. In addition, the direction of the main emission axis or the centre of rotation of the antenna can be factored in when determining the topology.

In this context, the source of the measurement signal means the location that would correspond to a distance of 0 m between the filling material surface and the antenna. As a rule, this source therefore corresponds with the source of the echo curve generated by the fill level measurement device. Depending on the formation of the measurement instrument generating and emitting the measurement signal, a different, distinctive point on the echo curve (for example the reflection of the electromagnetic wave at the antenna itself) can also be used as the source of the measurement signal. The source of the measurement signal can be set to a distance value of 0 m using a calibration method carried out at the factory.

The centre of rotation of the main emission axis should be understood to be the fixed point, about which the main emission axis is tilted during scanning of the surface of the filling material. In principle, this centre of rotation can change position as the main emission axis is tilted, depending on the mechanics used. In this case, the calculation of the topology of the filling material surface to be made including "source compensation" is to some degree more complex that that described in the following.

By taking into account the distance between the source of the measurement signal and the (current) centre of rotation of the main emission axis when calculating the topology of the surface of the filling material, the topology can be calculated with greater accuracy, which leads to a more accurate calculation of the fill level or of the mass or volume of the filling material in the next step, which is ultimately the compensation of a reference system.

By taking into account the distance between the source and the centre of rotation of the main emission axis, it is possible for the adjustment apparatus of the antenna unit used to scan the surface to have a mechanically simple design. Anomalies which occur due to this simple mechanical design when scanning the surface can be mathematically compensated for, in particular when the centre of rotation and the measurement signal source do not coincide or even if the axes of rotation of the antenna are not orthogonal to one another.

For example, various mechanical or electrical adjustment apparatuses can alternatively be used to change the direction of the main emission axis of the antenna unit, without thereby adversely affecting the measurement result, since the evaluation unit compensates for the shift in the centre of rotation of the main emission axis relative to the source of the measurement signal when determining the topology.

In addition, if the antenna emission direction is changed in at least one direction by digital beamforming, the fact that the source of the electromagnetic wave does not lie in the centre of rotation can then be compensated for.

When determining the topology, mathematical transformation can be used to compensate for a calculation error in the manner described above. Using the data prepared in this way, the topology of a bulk material surface can be depicted in a more accurate manner and the volume of the filling material can be calculated.

According to one embodiment of the invention, the evaluation unit is designed to compensate for the fact that, in the fill level measurement device, the source of the measurement signal does not lie in the centre of rotation of the main emission direction of the antenna unit when determining the topology of the surface of the filling material or bulk material.

According to another embodiment of the invention, the fill level measurement device is designed to rotate the main emission axis of the antenna unit about an axis of rotation of the main emission axis that intersects the centre of rotation.

According to another embodiment of the invention, the fill level measurement device is designed to change the direction of the main emission axis of the antenna unit by means of digital beamforming and/or by tilting the antenna unit. In particular, a combination of digital beamforming and tilting can be provided.

According to another embodiment of the invention, the fill level measurement device comprises an input apparatus for the user to input the distance between the source of the measurement signal and the centre of rotation of the main emission axis. This distance can, for example, be measured or ascertained by means of calibration.

According to another embodiment of the invention, the distance between the centre of rotation and the source of the measurement signal is made available to the evaluation unit in the form of Cartesian coordinates, whereas the direction of the main emission axis of the antenna unit is available in spherical coordinates, for example.

According to another embodiment of the invention, the fill level measurement device is designed to automatically determine the distance between the source of the measurement signal and the centre of rotation of the main emission axis of the antenna unit when the topology of the surface of the filling material or bulk material is known. Therefore, this distance can be determined by a calibration measurement when the surface topology is known.

This is advantageous in particular when this distance changes during scanning of the surface, when the antenna is recalibrated, when an antenna is replaced, etc.

According to another embodiment of the invention, the measurement signal comes from an FMCW radar.

According to another embodiment of the invention, the measurement signal comes from a fill level radar that works according to the pulse time-of-flight method.

Another aspect of the invention proposes a method for measuring the fill level, which determines the topology of a surface of the filling material or bulk material in order to determine the fill level of a filling material or bulk material. In this case, a measurement signal is first emitted towards the surface of the filling material or bulk material by means of an antenna unit. The direction of the main emission axis of the antenna unit relative to the surface is varied during emission of the measurement signal in order to sample the surface. A sequence of measurement signals can also be emitted and the direction of the main emission axis of the antenna unit is only changed during the intervals between the emission of the individual measurement signals. As a rule, however, the change in direction of the main emission axis is continuous and not gradual.

The measurement signal reflected at the filling material surface is received by the antenna apparatus of the measurement device and the topology of the surface of the filling material or bulk material is then determined from the received measurement signal reflected at the filling material surface and a distance between a source of the measurement signal and a centre of rotation of the main emission axis of the antenna unit.

A further aspect of the invention proposes a program element which, when executed on a processor of a fill level measurement device, instructs the fill level measurement device to carry out the method steps described above and below.

Another aspect of the invention proposes a computer-readable medium, on which a program element of the above-described type is stored.

In the following, embodiments of the invention will be described with reference to the drawings.

DETAILED DESCRIPTION OF EMBODIMENTS

Figure 1:
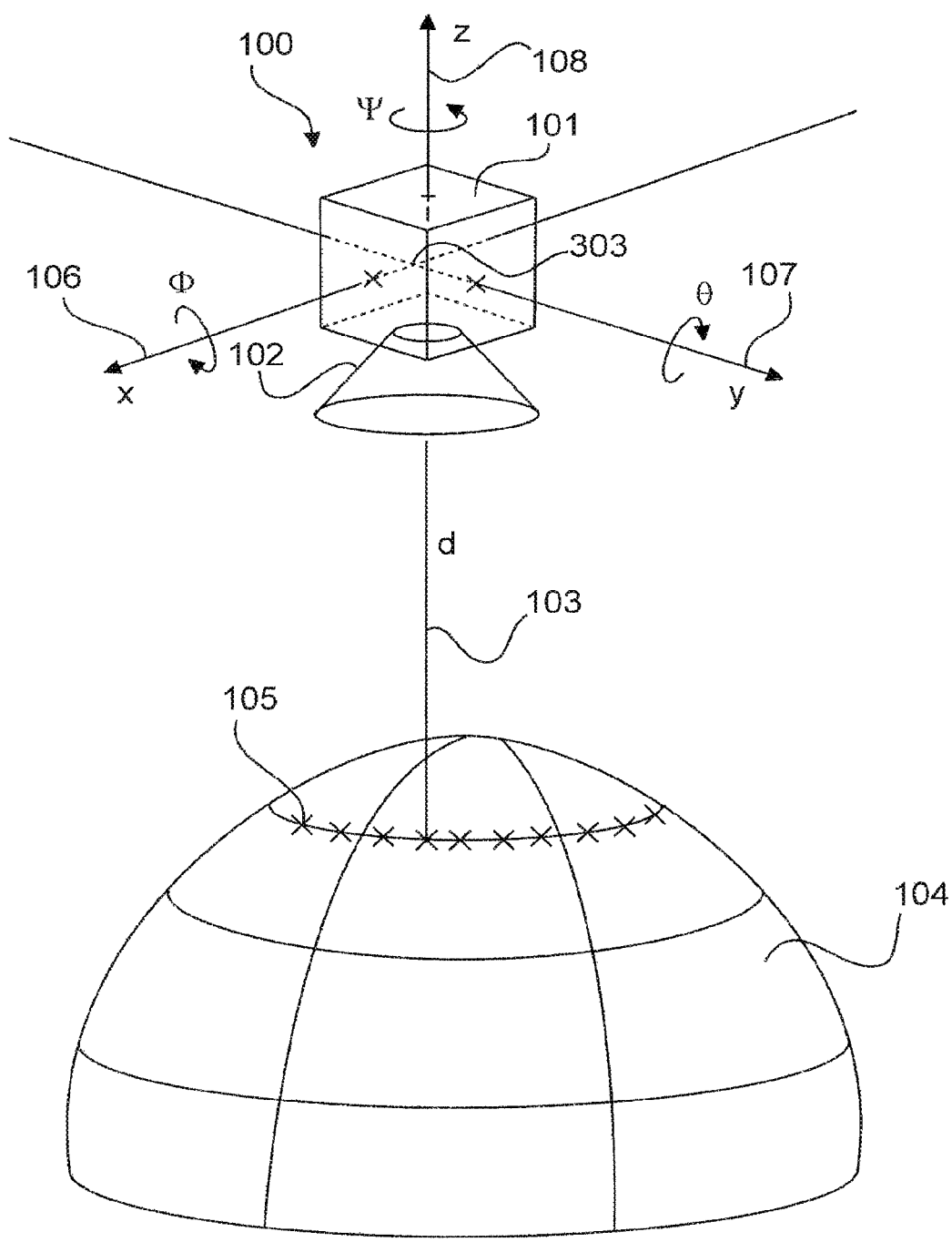
FIG. 1 shows a fill level measurement device and the surface of a bulk material to be measured.

The views in the drawings are schematic and not to scale.

When, in the following description of the drawings, the same reference numerals are used, they identify identical or corresponding elements. However, identical or corresponding elements may also be denoted by different reference numerals.

FIG. 1 shows a fill level measurement device and the surface of a bulk material to be measured. The object of the invention is intended to be that of determining the surface of a filling material in order to optionally calculate the volume or, if the density of the filling material is known, the weight of the filling material in an additional step. In particular in bulk materials, bulk peaks or troughs form (when the filling material in a container is removed from below), which bulk peaks or troughs cannot be clearly depicted by a simple fill level measurement device since said device only ascertains a simple distance value between the sensor and the bulk materials.

Should there be the desire to record the surface of the filling material, it is advantageous to pivot the sensor in a suitable manner and therefore to sample the surface by means of individual distance calculations. This is shown schematically in FIG. 1. A fill level measurement device 100 that comprises a housing 101, which accommodates the signal-generating electronics system and the evaluation electronics system, and an antenna unit 102, samples a bulk peak, for example line-by-line.

The fill level measurement device itself only ever determines a simple distance value 103 ($d$) at each sampling point or measuring point 105. The direction in which the distance value is intended to be recorded can be chosen by pivoting the transmission or receiving unit 102 (for example an antenna in radar measurement devices). Another embodiment describes pivoting the antenna unit or the entire fill level measurement device in a purely mechanical manner.

In a radar sensor, the emission direction of the antenna can be changed by means of digital beamforming, either as an alternative or in addition to mechanically pivoting the antenna unit. However, the method described below is still applicable in this case.

In the example in FIG. 1, the sensor 100 is rotated about the x axis 106 and the y axis 107 in order to sample the topology fully. As a rule, it can prove difficult to ensure that all axes of rotation coincide in a centre of rotation 303 and that the zero point or the source of the distance sensor (i.e. the "location" of the transceiver unit) is also in this centre of rotation at the same time.

The following method advantageously uses a calculation rule which makes it possible to depict the topology of the filling material from the pure distance values, which the sensor has ascertained, and the angles of rotation by which the sensor has been rotated out of its zero position.

A calculation rule for calculating the sensor values recorded by the fill level measurement device is described in the following in a 3D image:

If the angles of rotation $(\phi,\theta,\psi)$ of the individual axes are known (e.g. by means of incremental encoders), the surface can be depicted by means of the calculation rule described in the following.

The intended aim thereof is to convert the surface into a Cartesian coordinate system in order to visualise the topology or to derive additional calculations therefrom (e.g. calculating the volume). In addition, the calculation rule means that the source of the electromagnetic wave or the zero point of the rangefinder or the location of the transmission or receiving apparatus does not have to be identical to the centre of rotation.

It can generally be found that, during rotation (pivoting) or translation (movement) of the sensor, the reference system of the sensor, in which said sensor records the distance values, changes relative to the stationary reference system. In this case, the stationary reference system is defined by the container or the stockpile, for example. The mounting of the sensor has a fixed point in the stationary reference system.

Figure 2:
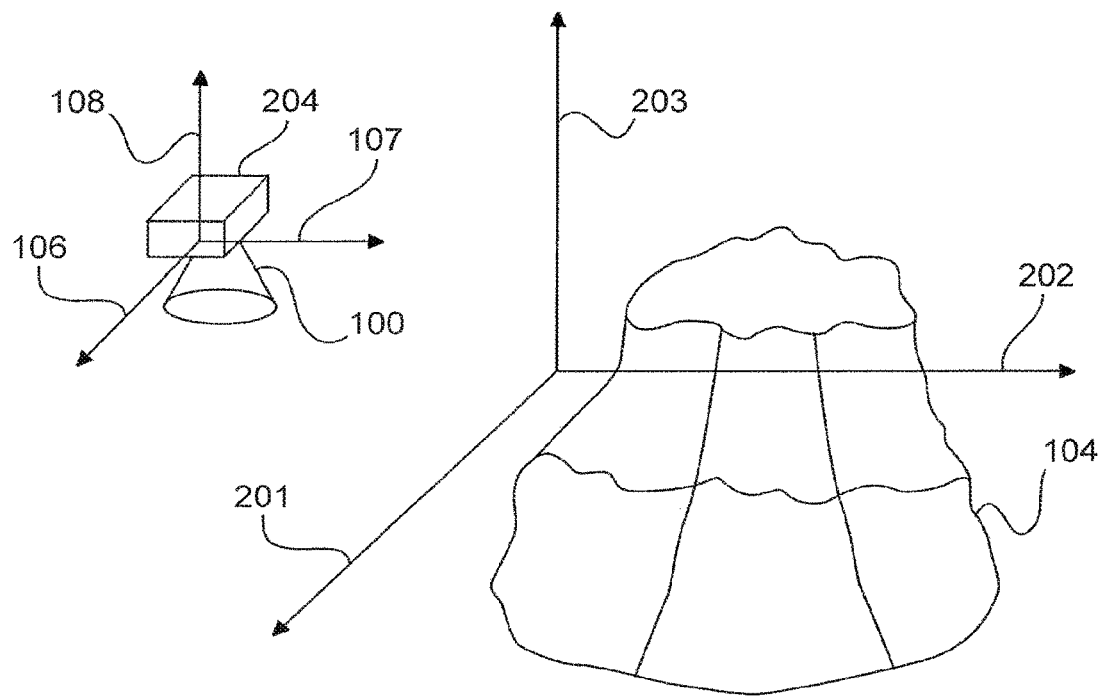
FIG. 2 shows the stationary reference system of a bulk material and the body-fixed reference system of a fill level measurement device.

FIG. 2 is intended to illustrate this point in more detail. Reference numerals 201, 202 and 203 denote the x, y and z axis of the stationary reference system, in which the filling material 104 to be measured (in this case a bulk peak) is located. The sensor 100, together with its mechanical rotary means 204, defines its own (body-fixed) reference system with the x, y and z axes 106, 107 and 108, which is shifted relative to the stationary reference system during a rotary or translational movement caused by the mechanical rotary means.

In this case, the fill level measurement device 100 only measures a distance value to the next point in the stationary coordinate system. If no rotation was made, i.e. the angles of rotation $(\phi,\theta,\psi)$ all equal zero, by definition the distance sensor measures in the z direction 203. The spatial axes of the stationary reference system and the body-fixed reference system are then parallel. This is of course only one possibility of how the axes of the two systems can be defined or how the sensor has been attached to the mechanical rotary means in the zero position.

The rotary and translational movements can be mathematically described as follows:

With regard to the stationary reference system 201, 202, 203, the rotational matrix Rx can describe a rotation of the sensor or the sensor antenna means about the x axis. The matrices Ry and Rz describe a rotation about the y or z axis.

$$R_x = \begin{pmatrix} 1 & 0 & 0 \\ 0 & \cos\phi & -\sin\phi \\ 0 & \sin\phi & \cos\phi \end{pmatrix}$$

$$R_y = \begin{pmatrix} \cos\theta & 0 & \sin\theta \\ 0 & 1 & 0 \\ -\sin\theta & 0 & \cos\theta \end{pmatrix}$$

$$R_z = \begin{pmatrix} \cos\psi & -\sin\psi & 0 \\ \sin\psi & \cos\psi & 0 \\ 0 & 0 & 1 \end{pmatrix}$$

By multiplying the individual matrices, the following matrix which describes a complete rotation about the three spatial angles is obtained for example.

$$R = \begin{pmatrix} \cos\theta\cos\psi & \begin{matrix}-\cos\phi\sin\theta + \\ \sin\phi\sin\theta\sin\psi\end{matrix} & \begin{matrix}\sin\phi\sin\psi + \\ \cos\phi\sin\theta\cos\psi\end{matrix} \\ \cos\theta\sin\psi & \begin{matrix}\cos\phi\cos\psi + \\ \sin\phi\sin\theta\sin\psi\end{matrix} & \begin{matrix}-\sin\phi\cos\psi + \\ \cos\phi\sin\theta\cos\psi\end{matrix} \\ -\sin\theta & \sin\phi\cos\theta & \cos\phi\cos\theta \end{pmatrix}$$

For the sake of clarity, the matrix is abbreviated in the following to:

$$R = \begin{pmatrix} R_{11} & R_{12} & R_{13} \\ R_{21} & R_{22} & R_{23} \\ R_{31} & R_{32} & R_{33} \end{pmatrix}$$

The matrix R can now be used to describe a stationary rotation of the distance sensor. However, if the source of the electromagnetic wave (e.g. the antenna in a radar sensor) is outside the centre of rotation, in addition to the purely rotational movement, a translational movement also takes place which cannot be disregarded.

It is possible to describe the interlinking between the translational and rotary movements using the following formula. The matrix R has been extended by one row and one column in this case. However, R11 to R33 correspond to the original matrix R. Extending the matrix helps make it possible to carry out the rotational and translational movements in one step and to illustrate the information using concise notation. The translational movement is described by the variables $\Delta x$, $\Delta y$, $\Delta z$. $\Delta x$ describes a translational movement in the x direction in this case, $\Delta y$ describes a translational movement in the y direction and $\Delta z$ accordingly describes a translational movement in the z direction $$\begin{pmatrix} x' \\ y' \\ z' \\ 1 \end{pmatrix} = \begin{pmatrix} 1 & 0 & 0 & \Delta_x \\ 0 & 1 & 0 & \Delta_y \\ 0 & 0 & 1 & \Delta_z \\ 0 & 0 & 0 & 1 \end{pmatrix} \cdot \begin{pmatrix} R_{11} & R_{12} & R_{13} & 0 \\ R_{21} & R_{22} & R_{23} & 0 \\ R_{31} & R_{32} & R_{33} & 0 \\ 0 & 0 & 0 & 1 \end{pmatrix} \cdot \begin{pmatrix} x \\ y \\ z \\ 1 \end{pmatrix} \quad \text{(Formula 3)}$$

$$= \begin{pmatrix} R_{11} & R_{12} & R_{13} & \Delta_x \\ R_{21} & R_{22} & R_{23} & \Delta_y \\ R_{31} & R_{32} & R_{33} & \Delta_z \\ 0 & 0 & 0 & 1 \end{pmatrix} \cdot \begin{pmatrix} x \\ y \\ z \\ 1 \end{pmatrix}.$$

The variables provided with a dash, x', y' and z', are the coordinates in the stationary coordinate system described by the axes 201, 202 and 203. The variables that do not have a dash, x, y and z, are the coordinates in the body-fixed coordinate system (viewed from the sensor). The angles of rotation ($\phi,\theta,\psi$), which have been calculated in the variables R11 to R33, and the translational movement $\Delta x, \Delta y, \Delta z$ show the rotation of the stationary system in the body-fixed system.

Full example with some numerical values:

The measurement means is intended to be configured as in FIG. 2. The sensor is intended to measure a distance value d in the z direction of the body-fixed coordinate system.

$$\begin{pmatrix} x \\ y \\ z \\ 1 \end{pmatrix} = \begin{pmatrix} 0 \\ 0 \\ -d \\ 1 \end{pmatrix}$$

The source of the electromagnetic wave is intended to lie in the body-fixed system due to the mechanical design, in a manner shifted by $\Delta z=k$ out of the centre of rotation. $\Delta y, \Delta z$ are intended to equal zero for the sake of clarity.

In this configuration, no information is obtained from a rotational movement about the z axis. $\psi$ therefore equals 0. The mounting of the sensor is intended to be located in the source of the space-fixed coordinate system (in this case the schematic drawing in FIG. 2 differs from the calculation). However, the definition leads to $\Delta x, \Delta y$ equalling 0 and $\Delta z$ simply equalling k.

Formula 3 is then simplified to:

$x'=R_{13} \cdot d = -\cos \Phi \cdot \sin \theta \cdot d$ $y'=-R_{23} \cdot d = \sin \Phi$ $z'=-R_{33} \cdot d + k = -\cos \Phi \cos \theta \cdot d + k$ In the simplest case, the angles of rotation ($\phi,\theta$) are now intended to equal zero. As a result, the sensor measures a downward distance value, which will also become clear in the formulae. The translational movement by the value k, which value results from the displacement between the source of the wave and the centre of rotation, can also be identified.

$x'=0$ $y'=0$ $z'=d+k$

Another numerical value for $\phi$ and $\theta$ is intended to be 45°.

$x'=-0.5 \cdot d$ $y'=\sqrt{2}/2 \cdot d$ $z'+-0.5 \cdot d+k$

In the example, it has therefore been shown how it is possible to convert the distance values from a simple distance sensor, which is rotated but does not lie in the centre of rotation, into the spatial point of the stationary reference system.

In a 3D plot, only the variables provided with a dash can be correctly visualised. Additional calculations can then be carried out on this plot, for example of the volume of the bulk peak by means of integration or object identification.

Figure 3:
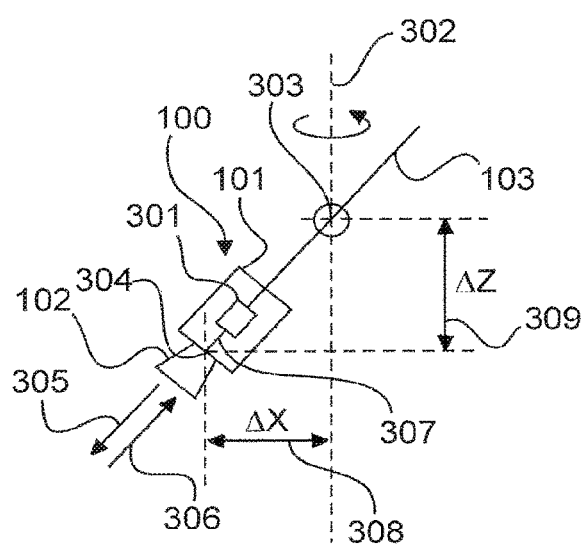
FIG. 3 shows a fill level measurement device together with the source of the measurement signal, the main emission axis of the antenna unit, a rotational axis and a centre of rotation of the main emission axis.

FIG. 3 shows a fill level measurement device 100 comprising an antenna unit 102 and an evaluation unit 301, which are interconnected by means of a signal path 307. The source of the measurement signal is located at point 304 on the base of the antenna. This source can also be located elsewhere and is ultimately associated with the calibration of the fill level measurement device, and can therefore in principle be changed mathematically.

The antenna 102 sends a measurement signal 305 to the filling material surface, which signal is reflected by the filling material surface and is then sent back to the antenna unit as a measurement signal 306 and is received thereby.

The fill level measurement device 100 or at least the antenna unit 102 can be rotated about the axis 302. An additional rotational axis extends through the centre of rotation 303, which extends perpendicularly to the plane of the drawing and is symbolised by a circular symbol. The fill level measurement device or the antenna can also be pivoted about this axis. In this way, it is possible for the main emission axis 103 of the antenna unit 102 to be able to scan the entire surface of the filling material.

However, the rotary point 303 is at a distance from the source 304 of the measurement signal 305. This distance can be indicated by the Cartesian coordinates $\Delta x$ 308 and $\Delta z$ 309. The y axis extends perpendicularly to the plane of the drawing and $\Delta y$ is equal to 0 in FIG. 3.

Figure 4:
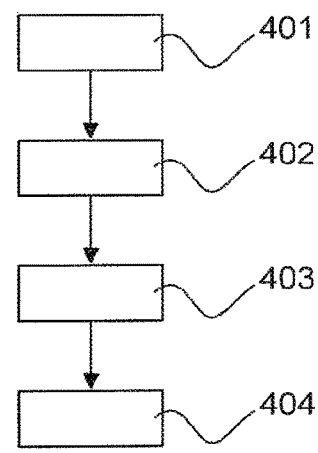
FIG. 4 is a flow diagram of a method according to an embodiment of the invention.

FIG. 4 is a flow chart of a method according to an embodiment of the invention. In step 401, the measurement signal is emitted towards the filling material surface by means of an antenna unit. In step 402, the antenna unit is continuously tilted and/or digital beamforming is carried out so that ultimately the direction of the main emission axis of the antenna unit is changed relative to the surface of the filling material. In step 403, the reflected measurement signal is taken up (over a relatively long period of time) and evaluated depending on the direction of the main emission axis of the antenna unit and at the particular distance between the source of the measurement signal and the centre of rotation of the main emission axis. The bulk material surface topology is then determined from this data, which ultimately makes it possible to more accurately determine the fill level/bulk material volume/bulk material mass.

It should also be noted that "comprising" and "having" do not exclude the possibility of other elements or steps, and "one", "a" or "an" does not exclude the possibility of a plurality. It should further be noted that features or steps which have been described with reference to one of the above embodiments may also be used in combination with other features or steps of other above-described embodiments. Reference numerals in the claims should not be treated as limiting.

The invention claimed is:

1. A fill level measurement device for determining a topology of a surface of a filling material or a bulk material, the fill level measurement device comprising:
   an antenna configured to emit a measurement signal towards the surface of the filling material or the bulk material in a direction of a main emission axis of the antenna relative to the surface, which direction can be changed by the fill level measurement device, in order to sample the surface, and configured to receive the measurement signal reflected at the filling material surface;
   evaluation circuitry configured to determine the topology of the surface of the filling material or the bulk material from the received measurement signal reflected at the surface and a distance between a source of the measurement signal and a center of rotation of the main emission axis.

2. The fill level measurement device according to claim 1, wherein the evaluation circuitry is configured to compensate for the fact that the source of the measurement signal does not lie in the center of rotation of the main emission axis when determining the topology of the surface of the filling material or the bulk material.

3. The fill level measurement device according to claim 2, wherein the compensation is carried out by mathematical transformation.

4. The fill level measurement device according to claim 1, wherein the fill level measurement device is configured to rotate the main emission axis about an axis of rotation thereof that intersects the center of rotation.

5. The fill level measurement device according to claim 1, further comprising:
an input for user input of the distance between the source of the measurement signal and the center of rotation of the main emission axis.

6. The fill level measurement device according to claim 1, wherein the distance between the center of rotation and the source of the measurement signal is made available to the evaluation circuitry in the form of Cartesian coordinates.

7. The fill level measurement device according to claim 1, wherein the fill level measurement device is configured to automatically determine the distance between the source of the measurement signal and the center of rotation of the main emission axis when the topology of the surface of the filling material or the bulk material is known.

8. The fill level measurement device according to claim 1, wherein the fill level measurement device is an FMCW radar.

9. The fill level measurement device according to claim 1, wherein the fill level measurement device is a fill level radar that works according to pulse time-of-flight method.

10. The fill level measurement device according to claim 1,
wherein the evaluation circuitry is configured to compensate for the fact that the source of the measurement signal does not lie in the center of rotation of the main emission axis when determining the topology of the surface of the filling material or the bulk material,
wherein the compensation is carried out by mathematical transformation, and
wherein the fill level measurement device is configured to rotate the main emission axis about an axis of rotation thereof that intersects the center of rotation.

11. The fill level measurement device according to claim 1, further comprising:
an input for user input of the distance between the source of the measurement signal and the center of rotation of the main emission axis,
wherein the evaluation circuitry is configured to compensate for the fact that the source of the measurement signal does not lie in the center of rotation of the main emission axis when determining the topology of the surface of the tilling material or the bulk material,
wherein the compensation is carried out by mathematical transformation, and
wherein the fill level measurement device is configured to rotate the main emission axis about an axis of rotation thereof that intersects the center of rotation.

12. The till level measurement device according to claim 1, further comprising:
an input for user input of the distance between the source of the measurement signal and the center of rotation of the main emission axis,
wherein the evaluation circuitry is configured to compensate for the fact that the source of the measurement signal does not lie in the center of rotation of the main emission axis when determining the topology of the surface of the filling material or the bulk material,
wherein the compensation is carried out by mathematical transformation,
wherein the fill level measurement device is configured to rotate the main emission axis about an axis of rotation thereof that intersects the center of rotation, and
wherein the distance between the center of rotation and the source of the measurement signal is made available to the evaluation circuitry in the form of Cartesian coordinates.

13. The fill level measurement device according to claim 1, further comprising:
an input for user input of the distance between the source of the measurement signal and the center of rotation of the main emission axis,
wherein the evaluation circuitry is configured to compensate for the fact that the source of the measurement signal does not lie in the center of rotation of the main emission axis when determining the topology of the surface of the filling material or the bulk material,
wherein the compensation is carried out by mathematical transformation,
wherein the fill level measurement device is configured to rotate the main emission axis about an axis of rotation thereof that intersects the center of rotation,
wherein the distance between the center of rotation and the source of the measurement signal is made available to the evaluation circuitry in the form of Cartesian coordinates, and
wherein the fill level measurement device is configured to automatically determine the distance between the source of the measurement signal and the center of rotation of the main emission axis when the topology of the surface of the filling material or the bulk material is known.

14. The fill level measurement device according to claim 1, further comprising:
an input for user input of the distance between the source of the measurement signal and the center of rotation of the main emission axis,
wherein the evaluation circuitry is configured to compensate for the fact that the source of the measurement signal does not lie in the center of rotation of the main emission axis when determining the topology of the surface of the filling material or the bulk material,
wherein the compensation is carried out by mathematical transformation,
wherein the fill level measurement device is configured to rotate the main emission axis about an axis of rotation thereof that intersects the center of rotation,
wherein the distance between the center of rotation and the source of the measurement signal is made available to the evaluation circuitry in the form of Cartesian coordinates,
wherein the fill level measurement device is configured to automatically determine the distance between the source of the measurement signal and the center of rotation of the main emission axis when the topology of the surface of the filling material or the bulk material is known, and wherein the fill level measurement device is an FMCW radar or a fill level radar that works according to pulse time-of-flight method.

15. A fill level measurement method which determines a topology of a surface of a filling material or a bulk material in order to determine the fill level of the filling material or the bulk material, the method comprising:
- emitting a measurement signal towards the surface of the filling material or the bulk material by means of an antenna;
- changing a direction of a main emission axis of the antenna relative to the surface in order to sample the surface;
- receiving the measurement signal reflected at the surface; and
- determining the topology of the surface of the filling material or the bulk material from the received measurement signal reflected at the surface and a distance between a source of the measurement signal and a center of rotation of the main emission axis.

16. A non-transitory computer readable medium having stored thereon a program element which, when executed on a processor of a fill level measurement device, instructs the fill level measurement device to carry out a fill level measurement method which determines a topology of a surface of a filling material or a bulk material in order to determine the fill level of the filling material or the bulk material, the method comprising:
- emitting a measurement signal towards the surface of the filling material or the bulk material by means of an antenna;
- changing a direction of a main emission axis of the antenna relative to the surface in order to sample the surface;
- receiving the measurement signal reflected at the surface; and
- determining the topology of the surface of the filling material or the bulk material from the received measurement signal reflected at the surface and a distance between a source of the measurement signal and a center of rotation of the main emission axis.

* * * * *